United States Patent Office 3,006,770
Patented Oct. 31, 1961

3,006,770
CONTROLLED CRYSTALLIZATION OF SHORTENING
Lars H. Wiedermann, Des Plaines, Ill., assignor to Swift & Company, Chicago, Ill., a corporation of Illinois
No Drawing. Filed Feb. 24, 1960, Ser. No. 10,543
7 Claims. (Cl. 99—118)

This invention relates to the controlled crystallization of fatty materials and more particularly to an improved method whereby a fully tempered plastic shortening material may be produced.

Plastic shortenings, including vegetable and animal fats of lard-like consistency and pastry margarines, are solidified during their manufacture by one of two well-known methods. The "chill roll" technique, which has now been largely supplanted by other methods, involves picking up a coating of the molten fat on the surface of an internally refrigerated longitudinal roll which revolves on its axis. The chill roll picks up a very thin coating of fat from a supply vessel containing molten fat, and the fat quickly congeals on the surface of the roll. A scraper mounted adjacent to the surface of the roll removes the congealed fat, which falls into a picker box. The picker box is equipped with a screw conveyor and paddles which work and beat air into the supercooled fat. From the picker box, the fat is pumped through homogenizing screens to a filling apparatus. The temperature of the fat leaving the chill roll is about 50-60° F., and although this temperature increases to about 70-80° F. in the picker box because of continued crystallization, there is still a further rise in temperature in the package resulting from latent heat of crystallization. Because supercooling of the fat is inherent in this method, fatty materials solidified in this manner require "tempering" in order to impart desirable creaming properties thereto.

Solidification in closed chilling machines such as the Votator chiller involves quick chilling and supercooling of the fat on the walls of externally refrigerated cylinders in the "A" unit, removal of the fat from these walls of the cylinders and subsequent crystallization in a "B" unit, where the fat is continuously worked as crystallization proceeds. In the chilling cylinder or "A" unit, the temperature of the fat is reduced to 60-65° F. with the establishment of many crystal nuclei. Heat of crystallization raises the temperature of the fat in the "B" unit in the range of 70-80° F. When the product is thereafter filled, there is evidence of an additional temperature rise in the package. After filling, the solidified product must be tempered for 24-72 hours and sometimes as long as 95 hours at a closely regulated temperature to develop desirable creaming and consistency characteristics.

When fats are supercooled, as in the quick-chilling processes described above, at a maximum temperature of approximately 32° F., they are much softer than when they are in a state of equilibrium. The necessity for quick-chilling a fat or shortening composition is to promote the formation of a large number of crystal nuclei or centers-of-crystallization without appreciable crystal growth, and as a result the product is supercooled and deposits imperfect crystals which vary considerably in composition. Equilibration of such a mixture can be accomplished only by molecular diffusion, and in practice this is done by "tempering" or holding the plastic fat at somewhat elevated temperatures to allow proper crystal growth and an increase in stiffness of the crystals in the fat mixture.

It is an object of the present invention to provide an improved method for the solidification of shortening materials wherein a substantial proportion of the latent heat of crystallization is removed rapidly, thus precluding temperature increases in filled packages.

A further object is the provision of a method whereby crystallization of fatty materials is controlled so as to produce a shortening having desirable creaming characteristics without the necessity for tempering.

Additional objects, if not specifically set forth herein, will be readily apparent from the detailed description which follows.

Generally, the method of this invention comprises atomizing a molten fat in a crystallization zone maintained under such conditions of temperature that a very fine mist of the molten fat is contacted with a cooled gaseous medium to cause crystallization of the fat or shortening composition without marked supercooling. By controlling the conditions of temperature and residence time in the cooling chamber, all of the sensible heat and virtually all of the latent heat of crystallization are removed with the formation of many crystallization centers by rapid nucleation, accompanied by an optimum of crystal growth on these nuclei. In controlling this crystal growth by conditions of no appreciable supercooling and almost complete dissipation of heat of crystallization, the equilibrium condition is achieved almost immediately. This equilibrium condition can be described as a state of crystal perfection, where homogeneity in both inter- and intra-crystal composition of the fat undergoing crystallization is achieved, and free flowing, tempered particles are obtained. While these shortening compositions are crystallized in a particulate form the particles tend to agglomerate and are not free-flowing particles under temperatures approximating room temperature conditions, i.e., 70-75° F. Generally, the particles agglomerate and become largely a plastic mass in the temperature range of about 50-90° F. In this temperature range, the shortenings are ductile and by comparison with hard or friable fats show a high degree of tensile strength. The crystallized form of these fats can be worked or molded easily without crumbling at room temperatures Since plastic shortening products which have not been tempered do not cream or incorporate air properly and also are of less desirable consistency than tempered shortenings, it is now general practice in the art to subject shortenings to a tempering process. Tempering is considered to be an unmixing process in which crystals made up of various glycerides are melted and solidified to produce crystals having fewer different glycerides and which are more homogeneous than in the untempered form. The tempering process involves storing filled cartons, cans, etc., of plastic shortening under carefully controlled temperature conditions for a period of from 24–96 hours. The composition of the shortening determines the temperature conditions under which it is tempered. Manufacturers producing a variety of shortenings must necessarily have several "tempering" rooms, held at various temperatures in order to temper their products. Therefore, a particular advantage of this invention resides in the fact that shortenings solidified in accordance with the method disclosed herein require no tempering.

Shortenings which may be treated in accordance with the method of this invention include both blended and all-hydrogenated types prepared from animal or vegetable fats and mixtures thereof. Because of the large number of variations in composition possible, it is difficult to define these products by physical characteristics although, in general, it can be stated that shortenings having a melting point range of about 102–125° F. and a softening point in the range of about 92–109° F. may advantageously be solidified in conformance with the present method. While melting point range and softening point range aid in the definition of the shortenings treated in accordance with the method of this invention, other characteristics such as iodine value and solid fat index of the fat serve to more particularly define these materials. Generally, plastic shortening compositions possess an iodine value (Wijs) of not lower than 45 units. With animal fat shortenings the iodine value will usually range between about 50–65 units while vegetable shortenings usually exhibit iodine values of 60–75 units.

Plastic range of these shortening materials is best described in terms of their solid fat indices (SFI) determined in accordance with Official and Tentative Methods of the American Oil Chemists Society, Method CD No. 10–57. The method involves a determination of the relative percent solids present in a fat or fat composition over a temperature range of 50–100° F. Solid fat indices of suitable shortening materials which may be treated in accordance with the method of this invention are set forth in Table A, which follows. These shortening materials are compared with hardened cottonseed oils which are representative of hard fats which would not be employed as a shortening composition. From this table it can be seen that a suitable shortening material should have a solid fat index at 50° F. of less than 45 units and a solid fat index at 100° F. of less than 25 units.

TABLE A

| Shortening | FAC, MP, °F. | FAC, SP, °F. | I.V. | Solids Fat Index | | | | |
|---|---|---|---|---|---|---|---|---|
| | | | | 50° F. | 70° F. | 80° F. | 92° F. | 100° F. |
| 1. Animal fat shortening | 123 | 116 | 61.2 | 28.9 | 22.6 | 21.8 | 18.2 | 14.8 |
| 2. Animal fat shortening | 121 | 110 | 58.6 | 28.8 | 24.4 | 22.4 | 16.4 | 11.8 |
| 3. Vegetable fat shortening | 124 | 116 | 64.9 | 26.4 | 20.4 | 19.0 | 14.6 | 11.0 |
| 4. Vegetable fat shortening | 122 | 118 | 72.1 | 39.9 | 29.6 | 25.8 | 16.8 | 10.3 |
| 5. Vegetable fat shortening | 125 | 119 | 74.0 | 30.6 | 21.1 | 18.7 | 14.3 | 10.8 |
| 6. Animal fat shortening | 121 | 116 | 66.6 | 29.1 | 21.8 | 20.9 | 16.4 | 13.2 |
| 7. Hydrogenated cottonseed oil | 122 | 120 | 46.3 | 73.3 | 71.5 | 69.9 | 60.0 | 57.0 |
| 8. Hydrogenated cottonseed oil | 131 | 130 | 34.1 | 78.3 | 79.0 | 78.6 | 77.4 | 72.2 |
| 9. Hydrogenated cottonseed oil | 138 | 137 | 18.3 | (1) | (1) | (1) | (1) | (1) |

1 Too hard to run.

In practicing the invention, the fatty material such as a blended animal and vegetable fat composition is liquefied by heating to a temperature above about 110° F. and preferably above about 130° F., and this molten fat is then atomized into a mist of fine particles. The dispersion of fine particles is conducted into a chamber or zone maintained at a temperature in the range 55–70° F. Dissipation of sensible heat of the fat causes this temperature to increase to the range 60–70° F. This range may be varied somewhat, the lower temperature limit being governed by the fact that the temperature must be slightly above that at which supercooling of the dispersed fat takes place, while the upper temperature limit must be sufficiently low to accomplish solidification of the fat. The low temperature limit maintained in the crystallization zone is, of course, increased somewhat by the heat of the molten fat which is introduced therein. The rate at which the molten fat enters the chamber as well as the rate at which the air flow carries off the heat introduced by the molten fat both affect the temperature of the fat within the chamber. Desirable results are achieved in one embodiment of the procedure if the atomizing nozzle or source of dispersed particles is placed at or near the top of a tower and the dispersed particles are permitted to pass downwardly through the tower in countercurrent contact with a cooling gas passing upwardly through the tower. Because of the high ratio of surface to mass in the dispersed particles, a very efficient contact of the particles with the cooling gas is provided and a large number of crystal nuclei are formed. Sensible heat and latent heat of crystallization are efficiently removed by the contact of the cooling gas with the particles, thus providing for optimum crystal growth. Homogeneous, very fine particles of desirable temperature stability thereby collect in the bottom of the crystallization zone and agglomerate.

The invention is further illustrated by the following examples:

*Example I*

A typical all-hydrogenated vegetable shortening having a melting point of 124° F. and a softening point of 118° F. was liquefied by heating and, after additional heating to 150–155° F. was conducted by gravity to a conventional laboratory spray-drying apparatus. The molten fat was atomized by feeding into an air-driven spinner (50,000 r.p.m. per 100 pounds air pressure) located at the top of the drying apparatus. The feed rate was about 4 kilograms of fat per hour. A concurrent stream of cool air maintained at a temperature of about 58–60° F. and a velocity of 3500–4000 c.f.m. was fed into the crystallization chamber. Under these conditions of rate of flow of the molten fat, temperature and rate of flow of the cooling gas, a mean temperature in the crystallization chamber of 62° F. was observed. The fat particles were transported by the air stream to a collector. The fat particles in the collector reached a maximum temperature of 75° F. The fully tempered particles ranged from about 50–150 microns. The particles soon agglomerated to form a plastic mass.

The tempered shortening product prepared in this manner possesses desirable creaming and consistency characteristics as demonstrated by the following cake baking test. In this test the shortening prepared as above was compared to a sample of the same shortening which was crystallized by votating and a further sample which was crystallized by votating followed by tempering. For convenience in comparing the shortening properties of these compositions, batter gravity and volume-producing characteristics were determined.

TABLE I

| | Pound Cake | |
|---|---|---|
| | Batter Gravity | Volume, ml. |
| A. Shortening I (chilled in Votator chiller not tempered) | 0.755 | 1,400 |
| B. Shortening I (chilled in Votator chiller, tempered 72 hours at 82–85° F.) | 0.720 | 1,415 |
| C. Shortening I (spray crystalized not tempered) | 0.700 | 1,505 |

From the above table, it can be seen that shortenings crystallized in accordance with the procedure of this invention possess superior creaming characteristics.

*Example II*

An all-hydrogenated emulsified-type vegetable shortening having a melting point of 121° F. and a softening point of 115° F. was solidified by controlled crystallization in a manner similar to that set forth in Example I. The incoming air was maintained at 62° F., with a mean chamber and exhaust temperature of 65° F. A product similar to that produced in accordance with the procedure of Example I was recovered from the collector. Because the shortening undergoing crystallization in this example contains mono- and diglycerides as an emulsifier, it is advisable to employ substantially the same cooling conditions in the crystallization chamber as was employed in Example I even though a somewhat softer fat is being treated in this case. Lower crystallization temperatures were not employed because the partial glycerides appear to possess an increased tedency to supercool. The shortening product produced in this example was employed as the shortening in the production of layer cakes in a cake baking test designed to compare the cake baking properties of this product with a fully tempered sample of the same fat chilled in a Votator chiller. In Table 2 the results of the test are set forth.

TABLE 2

|  | Layer Cakes | | | |
| --- | --- | --- | --- | --- |
|  | Batter Gravity | Volume (ml.) | Cake Height (inches) | Grain |
| Spray crystallized shortening | .870 | 1,020 | 3⅛+ | Good. |
| Chilled in Votator chiller fully tempered shortening. | .795 | 1,000 | 3⅜ | Good. |

*Example III*

A blended animal-vegetable fat shortening having a melting point of 120° F. and a softening point of 113° F. was melted and heated further to a temperature of about 160° F. The heated fat was conducted into a displacement pump and thence through an atomizing nozzle under a pressure of about 10 p.s.i. The atomizing nozzle was equipped with an orifice having a diameter of less than about 0.04 inch, and the molten fat was passed through this nozzle at the rate of about 2–3 kilograms per hour. The nozzle was located near the bottom of a conventional spray-drying apparatus, directing the fat upwardly into the chamber and into contact with a countercurrent flow of cool air maintained at 55° F. traveling at the rate of 3500–4000 c.f.m. The mean air temperature inside the chamber as well as the temperature of the exhaust air was 62° F. The crystals attained a temperature of about 70° F. in the collector. Cake baking tests comparing the shortening of this example with an untempered and also with a fully tempered sample of the same shortening is set forth in Table 3.

TABLE 3

|  | Pound Cake | |
| --- | --- | --- |
|  | Batter Gravity | Volume |
| Spray-dried shortening | .735 | 1,425 |
| Chilled in Votator chiller and fully tempered shortening | .725 | 1,435 |
| Chilled in Votator chiller untempered shortening | .875 | 1,320 |

*Example IV*

A plant-type spray-drying apparatus was employed in crystallizing a melt of an all-hydrogenated vegetable shortening. The shortening, which has a melting point of 125° F. and a softening point of 118° F., was pumped through a homogenizing pump at a pressure of 5000 p.s.i. to an atomizing nozzle having a 0.042 inch orifice. The molten fat, which was maintained about 10–15° F. above its melting point, was fed to the homogenizing pump at the rate of about 1500 pounds per hour. The air stream was fed into the dryer at the rate of 19,000 c.f.m. concurrently to the atomized oleaginous melt. Air temperature at the exhaust end of the dryer was 65° F. The mean temperature in the crystallization zone was also 65° F. The crystallized fat particles which were carried by the air stream to a collector reached a maximum temperature of 75° F., and although there was some slight agglomeration, the fat remained in particulate form. A determination of the average particle size distribution for this material is as follows:

70% less than 75 microns
20% between 74 and 105 microns
6% between 105 and 125 microns
3% between 125 and 150 microns When held at a temperature of 70–75° F. for some time the particles agglomerated to form a plastic mass.

In all cases, supercooling wherein the liquid and solid phases of fatty material have not reached equilibrium and wherein the fat contains less solids and is softer than a normal fat at the same temperature is to be avoided in the present method. It is for this reason that for a given fat treated by the method disclosed herein, the lower temperature limit of the crystallization area must be approximately 10° F. less than the alpha melting point of the lowest melting normally solid components of the shortening.

An additional advantage provided by the method of this invention resides in the fact that the fully tempered fats in particulate form are unusually adaptable for use in the preparation of prepared mixes containing fats or shortening compositions, particularly those prepared mixes requiring a fully tempered shortening agent. It is possible in the controlled crystallization method of this invention to conveniently prepare mixes by metering dry ingredients such as flour, sugar, leavening, etc., into the crystallization zone at a point below the area where crystallization of the fat particles takes place. The prepared mix may then be gathered in a dust collector, from whence it is removed and packaged. Formulation of the prepared mix in conjunction with the controlled crystallization of the fat provides a means of avoiding potential agglomeration problems in the storage of the particulate fat product. This, of course, is a distinct improvement over methods now employed in making up prepared mixes.

*Example V*

900 grams of hydrogenated all vegetable emulsified type shortening was spray-crystallized in the manner described in Example II. The atomized fat was sprayed onto a continuous stream of 4,330 grams sugar which is introduced from the top of the crystallizing zone. The other dry ingredients were introduced into the cooling chamber at a point below which the fat had been crystallized thereby effecting good mixing with the crystallized shortening-sugar mixture. The additional ingredients were as follows:

| Ingredient: | Amount, grams |
| --- | --- |
| Cake flour | 4120 |
| Salt | 100 |
| Dry skim milk solids | 300 |
| Dried egg whites | 800 |
| Soda | 70 |
| Dicalcium phosphate | 107 |
| Monocalcium phosphate | 36 |
| Sodium aluminum phosphate | 36 |

The method of this invention is also useful in the preparation of margarines and, in particular, for the manufacture of "pastry margarines." Pastry margarines used in the preparation of flaky or "puff" pastry and in certain pie crusts are formulated with a fair proportion of a high melting fat and larger proportions of liquid oil than are used in cake margarines. This oleaginous blend will give to a properly crystallized margarine the toughness and ductility necessary to stand up to heavy mechanical working. These margarines, unlike shortenings and cake margarines, do not take part in the leavening effect of the cereal part of the dough but, rather, interleave the prepared dough, remaining as thin, continuous films without crumbling when rolled under pressure during baking and when afterwards cooled. The function of pastry margarines is one of adhesion and not absorption, and therefore these products must have a firm, tough consistency.

Bakery and pastry margarines are now manufactured by passing the formulated emulsion through a churn to a chill roll where the emulsion is rapidly crystallized in the form of a solid film. Because the fat is supercooled and solidifies as small crystals on the chill roll, it is necessary to temper the crystallized margarine for from 1 to 2 days in order to stabilize its structure so as to avoid too much softening (point of observed thixotropy) during subsequent kneading steps. The product is kneaded or mechanically worked in Doring worker-type equipment, which is well known to the art, and then extruded in a slab form or through a perforated disc in the form of noodles. This process is repeated several times with intermittent tempering periods to develop the proper crystal structure in the fat and give it the required texture necessary for high workability.

Pastry margarines crystallized in accordance with the method of this invention are immediately fully tempered, having a stabilized crystal structure resulting from an optimum of crystal growth and can be directly kneaded in Doring worker-type equipment without first being tempered. By employing the method of this invention for the initial crystallization of pastry margarines the number of kneading steps and periods of intermittent tempering can be reduced while still imparting to the margarine a level of malleable strength found in tempered, mechanically-worked, chill roll-crystallized products.

When shortenings and cake margarines are crystallized, comprised, and extruded as described above, they will be immediately fully tempered and have a consistency comparable to their corresponding tempered products which had been chilled in a Votator chiller.

This application is a continuation in part of co-pending application S.N. 674,023, filed July 25, 1957, and now abandoned.

Obviously many modifications and variations of the invention as hereinbefore set forth may be made without departing from the spirit and scope thereof, and therefore only such limitations should be imposed as are indicated in the appended claims.

I claim:

1. A method of preparing a plastic shortening agent having an improved equilibrium between inter- and intra-crystal composition to produce a fully tempered product which comprises: spraying a liquefied normally solid shortening composition having a solid fat index at 50° F. of less than 45 units and a solid fat index at 100° F., of less than 25 units into a crystallizing atmosphere, adjusting the temperature of said crystallizing atmosphere to a level of about 60–70° F. whereby plastic particles are formed, and collecting the plastic shortening particles.

2. A method of preparing a plastic shortening having an improved equilibrium between inter- and intra-crystal composition to provide a tempered product which comprises: spraying a liquefied normally solid shortening composition having an iodine value of not lower than 45 units into a crystallizing atmosphere, adjusting the temperature of said crystallizing atmosphere in the range of about 70° F. and a temperature slightly above the temperature at which said shortening is supercooled whereby plastic particles are formed, and collecting the plastic shortening particles.

3. A method of producing a tempered plastic shortening product which comprises: heating a plastic shortening composition having a solid fat index at 50° F., of less than 45 units and a solid fat index at 100° F., of less than 25 units and a softening point of about 92–119° F. at an elevated temperature sufficient to liquefy such shortening, atomizing said liquefied product in a zone maintained at a temperature below the melting point of said shortening and above the temperature at which said shortening supercools whereby to provide rapid crystal nucleation with an optimum of crystal growth, and collecting the crystallized product.

4. A method of producing a pastry margarine which comprises: atomizing an emulsion containing above about 80% fat and water in a zone maintained at a temperature below the melting point of said fat and approximately 10° F. less than the alpha melting point of the lowest melting normally solid component of said emulsion whereby to provide a fully tempered pastry margarine product.

5. A method of preparing a margarine having an improved equilibrium between inter- and intra-crystal composition to produce a tempered product which comprises: spraying a liquefied normally solid margarine into a crystallizing atmosphere, adjusting the temperature of said crystallizing atmosphere to a level of about 60–70° F. whereby margarine is solidified into particles, and collecting the margarine particles.

6. A method of producing a tempered shortening product having an improved equilibrium between inter- and intra-crystal composition comprising: heating a plastic shortening having an iodine value of not lower than 45 units at an elevated temperature above about 110° F. to liquefy said shortening, atomizing said liquefied shortening to form a dispersion of fine particles, conducting said dispersion to a crystallization zone maintained at a temperature in the range of 55–70° F. to solidify said fine particles and collecting the plastic shortening particles.

7. A method of producing a particulate prepared mix containing a fully tempered shortening which comprises: spraying a liquefied normally solid shortening composition having a melting point of about 102–125° F. and a softening point of about 92–119° F. into a crystallizing atmosphere, adjusting the temperature of said crystallizing atmosphere to a level of about 60–70° F. whereby a cloud of plastic shortening particles is formed, metering dry particulate ingredients into said cloud of plastic shortening particles, and collecting the resulting particulate mixture having tempered shortening distributed uniformly therethrough.

References Cited in the file of this patent

UNITED STATES PATENTS

| | | |
|---|---|---|
| 788,446 | Wilson | Apr. 25, 1905 |
| 1,329,845 | Overbeck | Feb. 3, 1920 |
| 2,035,899 | Kraft | Mar. 31, 1936 |
| 2,557,135 | Nelson et al. | June 19, 1951 |
| 2,785,983 | McMath | Mar. 19, 1957 |
| 2,835,588 | Alexander et al. | May 20, 1958 |

UNITED STATES PATENT OFFICE
CERTIFICATE OF CORRECTION

Patent No. 3,006,770                          October 31, 1961

Lars H. Wiedermann

It is hereby certified that error appears in the above numbered patent requiring correction and that the said Letters Patent should read as corrected below.

Column 5, line 6, for "tedency" read -- tendency --; line 64, strike out the comma; column 8, line 7, strike out "and a softening point of about 92-119° F.

Signed and sealed this 10th day of April 1962.

(SEAL)
Attest:

ERNEST W. SWIDER                                 DAVID L. LADD

Attesting Officer                                     Commissioner of Patents